(No Model.)
M. IMMISCH.
VOLUTE TUBE THERMOMETER.
No. 251,889. Patented Jan. 3, 1882.
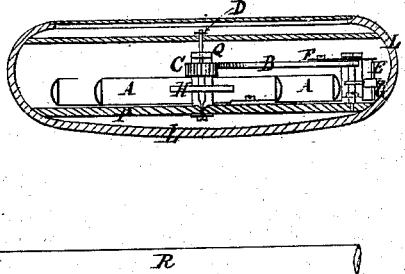
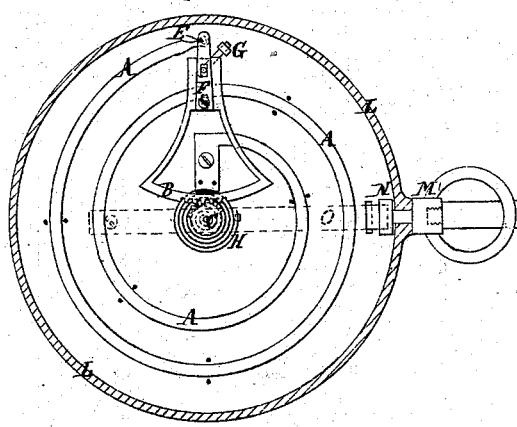
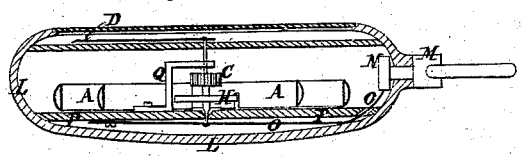
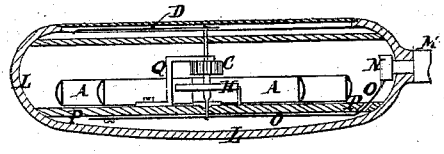
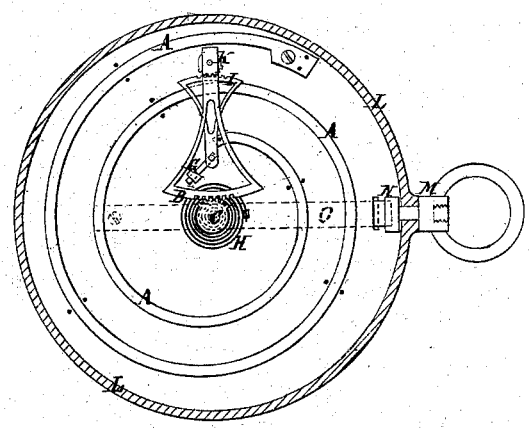
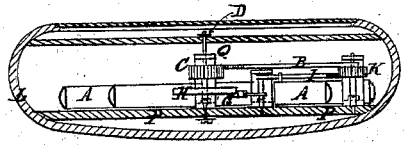
Witnesses:
J. C. Turner
Aug. Jordan
Inventor.
Moritz Immisch
per R. D. O. Smith.
Attorney.

UNITED STATES PATENT OFFICE.

MORITZ IMMISCH, OF LONDON, COUNTY OF MIDDLESEX, ENGLAND.

VOLUTE-TUBE THERMOMETER.

SPECIFICATION forming part of Letters Patent No. 251,889, dated January 3, 1882.

Application filed August 1, 1881. (No model.) Patented in England July 6, 1881.

*To all whom it may concern:*

Be it known that I, MORITZ IMMISCH, of London, in the county of Middlesex, England, have invented a new and useful Improved Thermometer, of which the following is a specification.

My invention relates especially to thermometers to be used for clinical purposes, where smallness, portability, and handiness are requisite; and it consists, essentially, in the employment of a volute tube acting on the Bourdon principle, which tube is caused to give motion to a pointer or hand. The tube has a suitable number of turns, and may be fixed either at its inner or at its outer end. When the tube is fixed at its inner end the outer or free end acts upon a rack, which gears with a pinion, the spindle of which carries the pointer or hand. By way of connecting the extremity of the tube with the rack, the former is provided with a pivot corresponding to a jewel-hole fitted to the end of a flat spring, which is screwed on the face of the rack. The flat spring has slots cut into it, so as to allow it to be shifted for the purpose of adjusting the motion of the rack. The axis of the rack carries a weight or counterpoise, which serves to properly poise the system in the vertical positions. The spindle of the center pinion carrying the hand or pointer is fitted with a hair-spring, which serves, in the first place, to keep the teeth of the pinion well against those of the rack, and, secondly, as its force is opposed to the action of the tube it serves to effect the final adjustment. When the outer end of the volute tube is fixed an intermediate rack is employed, against the side of which the free or inner end of the tube abuts, either simply by means of an upright pin or by means of a pivot and hole. This rack communicates its motion to a pinion fitted to a second rack, gearing with the center pinion carrying the indicating hand or pointer. A counterpoise on the rack and a hair-spring on the spindle of the center pinion are provided as in the first arrangement.

The whole of the mechanism is inclosed in a suitable metal case provided with a suitably-divided face and covered with a glass or crystal.

With this instrument the pointer is moved over the dial by expansions and contractions of the tube, due to changes of tension under variations of temperature. They may be due to pressures, either external or internal to the tube. Generally the tube is filled with some highly-expansible fluid, such as alcohol; but in some cases the volute tube may be exhausted of air and hermetically sealed, and the surrounding space of the case, which latter is rendered air-tight, may be filled with a highly-expansive and heat-absorbing vapor, which, being acted upon by the heat, would expand and compress the tube, the mechanical arrangements being similar to those above described. This plan of using an exhausted tube would be preferable for instruments intended to register surface temperatures. In such instruments the mechanism would be fixed on a thin silver plate, which would be the part coming in contact with the surface to be examined, the rest of the case being made of a non-conducting material. In each case means are provided by which the hand or pointer may be fixed after a temperature has been taken or registered.

The bow or handle of the instrument is made movable, permitting a motion of a quarter of a turn. The pivot of the stem reaches into the inside of the case and carries an eccentric, against the circumference of which rests a spring fixed to the bottom surface of the plate carrying the whole mechanism. This spring is fitted with a jewel-end stone, upon which the spindle of the center pinion carrying the indicating-hand or pointer runs. When the bow or handle is turned upright the eccentric permits the spring to rise, in doing which it lifts the pinion and presses its face against the face of the bracket, in which the top end of the spindle revolves. The friction thus produced resists the motion of the tube and fixes the indicating-hand or pointer. On turning the bow or handle back a quarter of a turn the eccentric forces the spring downward and the pinion is instantly released. The stopping of the hand or pointer may also by any simple contrivance be varied so as to take place laterally instead of longitudinally by an arm or spring, or arms or springs pressing against a disk fixed for that purpose on the center pinion-spindle. The bow is split so as to allow a long handle to be introduced and screwed into the stem, if required.

In order that my invention may be more clearly understood, I will proceed to describe the same by the aid of the accompanying sheet of drawings, in which—

Figure 1 is a plan of the instrument, in which the inner end of the volute tube is fixed. Fig. 2 is a transverse section of the same. Fig. 3 is a plan of the instrument, in which the outer end of the volute tube is fixed. Fig. 4 is a transverse section of the same. Figs. 5 and 6 are vertical sections through Figs. 1 and 3, showing one arrangement for fixing the hand or pointer after a temperature has been taken or registered.

Referring to Figs. 1 and 2, A is the volute tube, either exhausted of air or filled with a highly-expansive fluid—such as ether or alcohol—expanding in heat and contracting in cold. This tube is fixed at its inner end, and its outer or free end acts upon a rack, B, which gears with a pinion, C, the spindle of which carries the pointer or hand D. In order to connect the free end of the tube A with the rack B, the former is provided with a pivot, E, corresponding to a jewel-hole, fitted to the end of a flat spring, F, which is screwed on the face of the rack. This flat spring has slots cut through it, so as to allow it to be shifted for the purpose of adjusting the motion of the rack. The axis of the rack carries a weight or counterpoise, G, which serves to properly poise the system in the vertical positions. The axis of the center pinion, C, carrying the hand or pointer D, is fitted with a hair-spring, H, which serves in the first place to keep the teeth of the pinion C well against those of the rack B, and, secondly, as its force is opposed to the action of the tube A it serves to effect the final adjustment.

Referring to Figs. 3 and 4, in which the outer end of the volute tube A is fixed, an intermediate rack, I, is employed, against the side of which the free or inner end of the tube A abuts, either simply by means of an upright pin, as shown, or by means of a pivot and hole, as in the first arrangement above described. This rack I communicates its motion to a pinion, K, fitted to a second rack, B, gearing with the center pinion, C, the axis of which carries the indicating-hand or pointer D. The counterpoise G on the rack I and the hair-spring H on the axis of the center pinion, C, are provided as in the first arrangement.

The whole of the mechanism is inclosed in a suitable case, L, provided with a suitably-divided face and covered with a glass or crystal.

Referring to Figs. 5 and 6, one arrangement is shown for fixing the hand or pointer after a temperature has been taken or registered. The bow or handle M of the case is made movable, permitting a motion of a quarter of a turn. The pivot of the stem reaches into the inside of the case L and carries an eccentric, N, against the periphery of which rests the free end of a spring, O, fixed to the bottom surface of the plate P, carrying the whole mechanism. This spring is fitted with a jewel-end stone, upon which the spindle of the center pinion, C, carrying the indicating-hand or pointer D runs. When the bow or handle M is turned upright the eccentric N permits the spring O to rise, thereby lifting the pinion C and pressing its face against the under side of the bracket Q, in which the top end of the spindle revolves. The friction thus produced resists the motion of the tube and fixes the indicating-hand or pointer. On turning the bow or handle M back again the eccentric N forces the spring downward, and the pinion is instantly released. The bow M is split, so as to allow a long handle, R, to be introduced and screwed into the stem, if required.

Having now described the nature of my invention and the manner of carrying the same into effect, I wish it to be understood that what I claim is—

1. An instrument for indicating temperatures, consisting of a volute tube hermetically sealed at both ends, fixed at one end and free at the other, combined with a dial, a pointer to move over said dial, and suitable means for connecting said pointer with the free end of said tube, whereby changes of temperature causing corresponding changes of tension of said tube and resultant movements of its free end will be indicated by said pointer.

2. The volute tube fixed at one end, exhausted of air, and hermetically sealed at both ends, combined with a surrounding space filled with highly-expansive heat-absorbing vapor, and suitable mechanism to move a hand or pointer over a suitably-divided dial when said tube expands or contracts.

3. The tube A, fixed at one end and at its free end attached to the pivoted segment-track I, combined with the pivoted segment B and the segment K, fixed thereto and in engagement with the segment I, and the indicator-bearing pinion C, as set forth.

4. The volute tube and the revolving indicator-hand, with suitable connecting mechanism, combined with a step bearing-spring, whereon the spindle of said indicator is supported, and means whereby said spring may at will be depressed or released, and when said spring is released said spindle will be raised up and arrested in position.

5. A volute tube and a revolving indicator-hand carried by a spindle controlled by the expansion or contraction of said tube, combined with the step bearing-spring O, eccentric N, and means whereby said spindle and indicator may be arrested when raised up.

MORITZ IMMISCH.

Witnesses:
HERBERT JOHN ALLISON,
CHARLES ARTHUR ALLISON.